US009463427B1

(12) United States Patent
Koseoglu et al.

(10) Patent No.: US 9,463,427 B1
(45) Date of Patent: Oct. 11, 2016

(54) CATALYST REACTOR BASKET

(71) Applicant: Saudi Arabian Oil Company, Dhahran (SA)

(72) Inventors: Omer Refa Koseoglu, Dhahran (SA); Salman J. Al-Khaldi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/714,798

(22) Filed: May 18, 2015

(51) Int. Cl.
B01J 8/24 (2006.01)
B01J 8/44 (2006.01)
B01J 8/00 (2006.01)
B01J 8/02 (2006.01)

(52) U.S. Cl.
CPC ........... B01J 8/008 (2013.01); B01J 8/02 (2013.01); B01J 2208/00884 (2013.01); B01J 2208/025 (2013.01)

(58) Field of Classification Search
CPC .......... B01J 8/008; B01J 8/24; B01J 19/305; B01J 19/325; B01J 8/44
USPC ........................................................ 422/311
See application file for complete search history.

(56) References Cited

U.S. PATENT DOCUMENTS

| 4,102,652 | A | * | 7/1978 | Vogl | ........................... B01J 8/06 29/469 |
| D257,281 | S | | 10/1980 | Ganter et al. | |
| 4,662,669 | A | * | 5/1987 | Erickson | ................ B01J 8/0015 206/596 |
| 7,314,603 | B2 | * | 1/2008 | Filippi | .................. B01J 8/0035 422/198 |
| 7,497,998 | B2 | * | 3/2009 | Tabak | .................... B01J 8/0242 422/171 |
| 2004/0018124 | A1 | | 1/2004 | Filippi et al. | |
| 2011/0194991 | A1 | * | 8/2011 | Jin | ........................... B01J 8/048 422/211 |

* cited by examiner

Primary Examiner — Huy-Tram Nguyen
(74) Attorney, Agent, or Firm — Leason Ellis LLP

(57) ABSTRACT

A catalyst reactor basket is provided that includes an outer side wall extending along the outer circumferential periphery and an inner side wall disposed within the outer side wall. An aperture is sized and shaped to allow a fluid to flow axially with respect to the basket. First and second covers are disposed on opposite ends of the outer side wall and inner side wall and a dividing wall is disposed between the first and second covers. The dividing wall defines a first and second chamber within the inner volume of the basket. A plurality of partitions are disposed within the first and second chambers. The plurality of partitions define a plurality of compartments within the first and second chambers, each compartment being sized and shaped to receive a catalyst.

11 Claims, 5 Drawing Sheets

CATALYST REACTOR BASKET

FIELD OF THE INVENTION

The present invention relates to catalyst reactor baskets.

BACKGROUND OF THE INVENTION

Catalyst reactor systems having differing designs are known in various documents, including, among others, U.S. Design Pat. No. D257,281 entitled "Fossil Fuel Catalyst Generator" and U.S. Pat. Pub. No. 2004/0018124 entitled "Comprises cylindrical basket suitable for containing pre-determined amount of catalyst; improved materials handling." The specific designs and features of the catalyst baskets described in these documents can best be appreciated by a review of their respective disclosures.

SUMMARY OF THE INVENTION

Figure 1A:
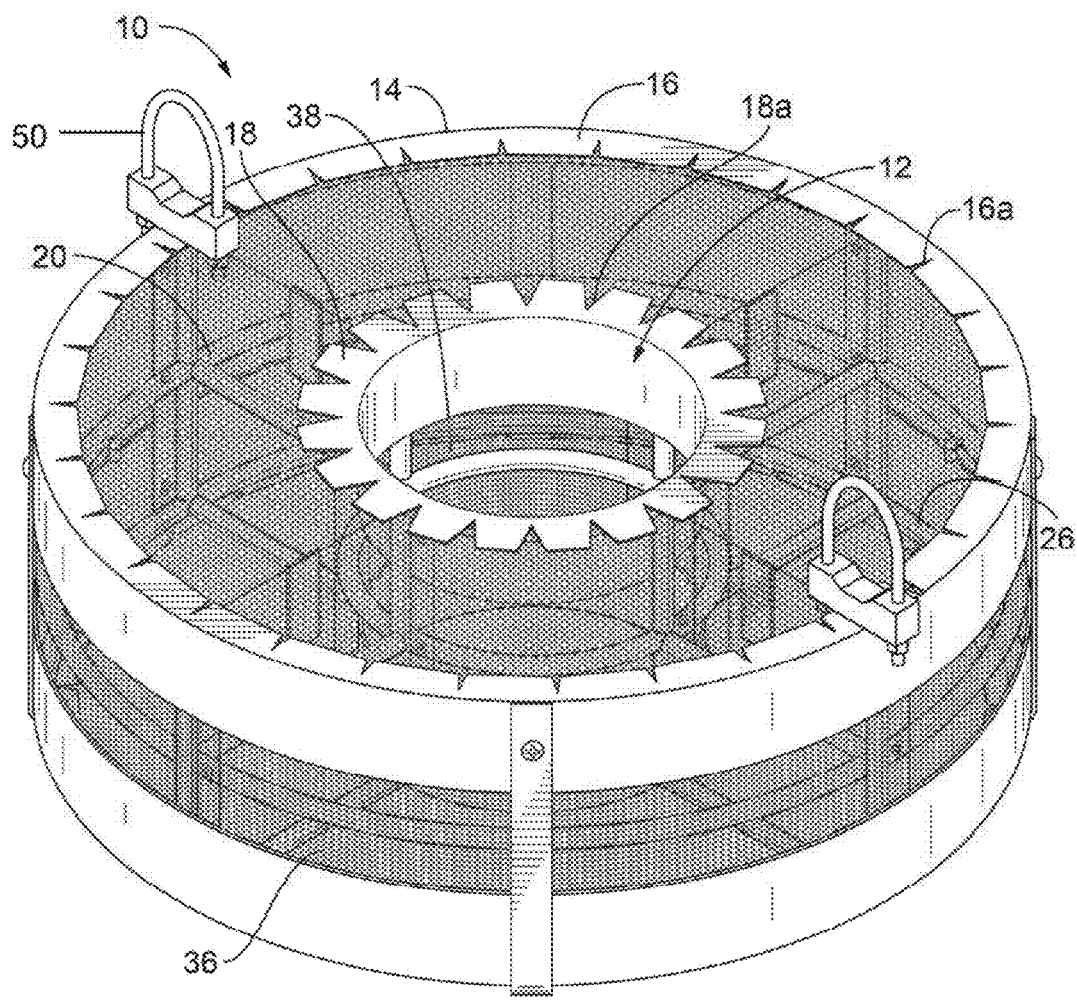
FIG. 1A is a top perspective view of the catalyst reactor basket with a cover attached according to an embodiment of the invention.

According to an aspect of the present invention, a catalyst reactor basket is provided. The catalyst basket includes an outer side wall extending along the outer circumferential periphery of the basket and extending in an axial direction to define a generally cylindrical inner volume of the basket. At least a portion of the outer side wall is fluid permeable. The catalyst basket includes an inner side wall disposed within the outer side wall. The inner side wall extends circumferential and axially to define an aperture that defines an inner boundary of the volume of the basket. The aperture is sized and shaped to allow a fluid to flow axially with respect to the basket. At least a portion of the inner side wall is fluid permeable. First and second covers are disposed on opposite ends of the outer side wall and inner side wall. The first and second covers define respective ends of the inner volume of the basket, at least a portion of the first and second covers being fluid permeable. A dividing wall is disposed between the first and second covers. The dividing wall defines a first and second chamber within the inner volume of the basket. At least a portion of the dividing wall is fluid permeable. A plurality of partitions are disposed within the first and second chambers. Each partition extends radially between the outer side wall and the inner side wall and extends axially between the dividing wall and a respective cover. The plurality of partitions define a plurality of compartments within the first and second chambers, each compartment being sized and shaped to receive a catalyst.

In accordance with a further aspect, a first compartment in the first chamber is aligned with a second compartment in the second chamber along an axis of the basket such that any fluid can flow through the first compartment and subsequently flow through the second compartment.

In accordance with yet a further aspect, the first compartment is sized to receive a first catalyst and the second compartment is sized to receive a second catalyst such that the fluid first contacts the first catalyst and subsequently contacts a second catalyst along an axial flow path of the fluid.

In accordance with a yet further aspect, the first catalyst has properties that are different from the second catalyst.

In accordance with a further aspect, the partitions provide a fluid barrier between adjacent compartments.

In accordance with a further aspect, at least one compartment is sized to receive a first catalyst that has different properties than a second catalyst in an adjacent compartment.

In accordance with a further aspect, the catalyst basket includes a support frame wherein the outer wall, inner wall, and dividing wall are supported by the frame.

In accordance with a yet further aspect, the catalyst reactor basket includes clips that removablely secure the covers to respective ends of the basket.

In accordance with a further aspect, hooks are coupled to the basket, the hooks being sized and shaped to support the basket such that the basket hangs from the hooks.

In accordance with a further aspect, at least a portion of the inner side wall is fluid permeable.

In accordance with a further aspect, at least a portion of the outer wall is fluid permeable.

DETAILED DESCRIPTION OF CERTAIN EMBODIMENTS

Figure 1B:
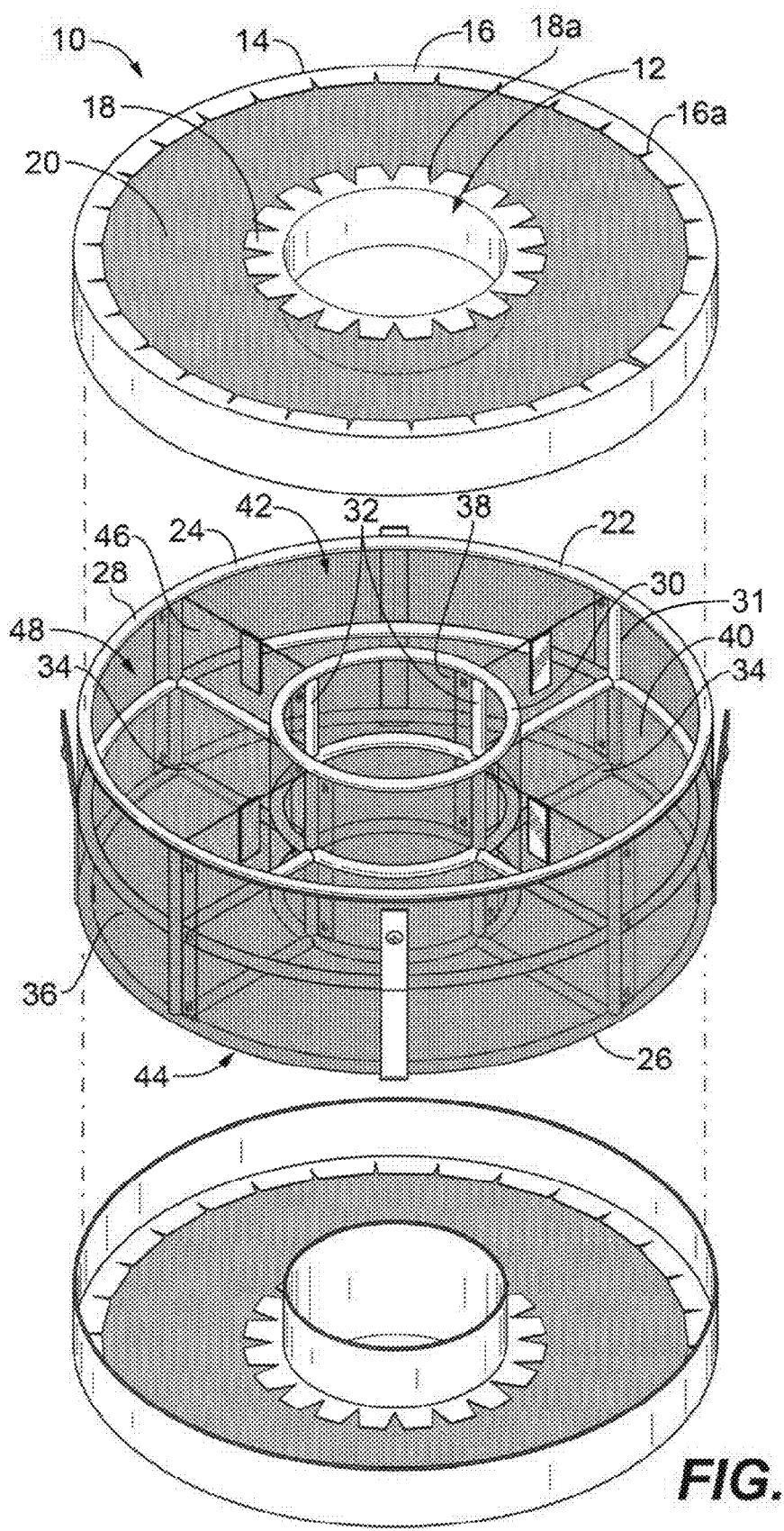
FIG. 1B is an exploded, top perspective view of the catalyst reactor basket.

Referring to FIGS. 1A and 1B, a catalyst reactor basket 10 is shown. The basket is generally cylindrical in shape and has a generally circular aperture 12 that extends axially through the basket. A cover 14 is provided at the top end of the basket. A cover is also provided at the bottom end the basket. The cover includes an outer rim 16 and an inner rim 18. The rims 16, 18 extend around the periphery of the covers and provide structural rigidity to the cover. The rims can include relief cuts 16a and 18a in order to aid in forming the rims into circular rings. The relief cuts can vary in size and shape. A mesh 20 extends between the rims 16 and 18. The mesh 20 is sized and shaped to provide holes that allow fluid to pass through the mesh during use of the catalyst basket while also preventing catalyst particles from passing through the mesh. As such, the catalyst particles are retained within the basket. The mesh 20 can be attached the rims 16 and 18 by, for example, welding the mesh to the rims such as by spot welding. Other suitable attachments are possible.

Figure 2:
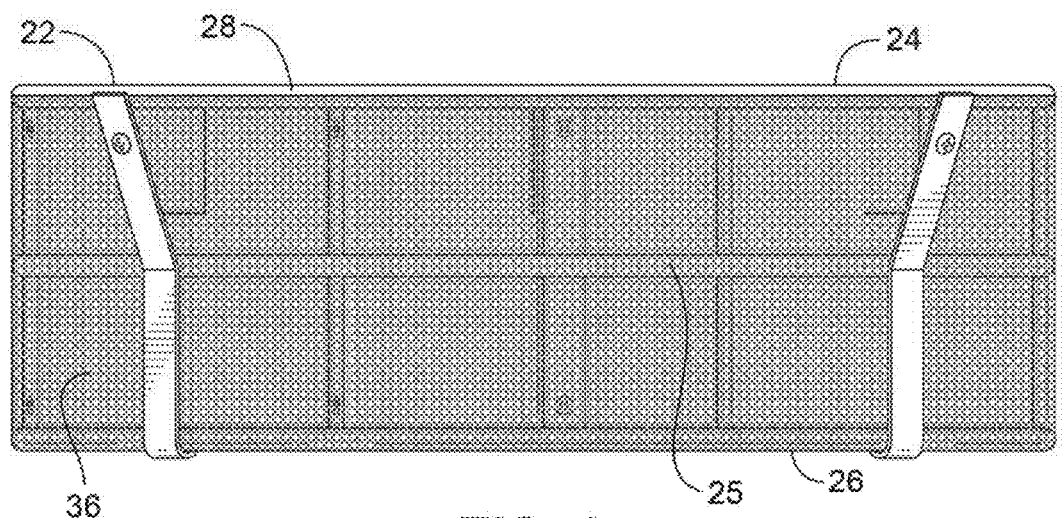
FIG. 2 is a side perspective view of the catalyst reactor basket with the cover removed.
Figure 3:
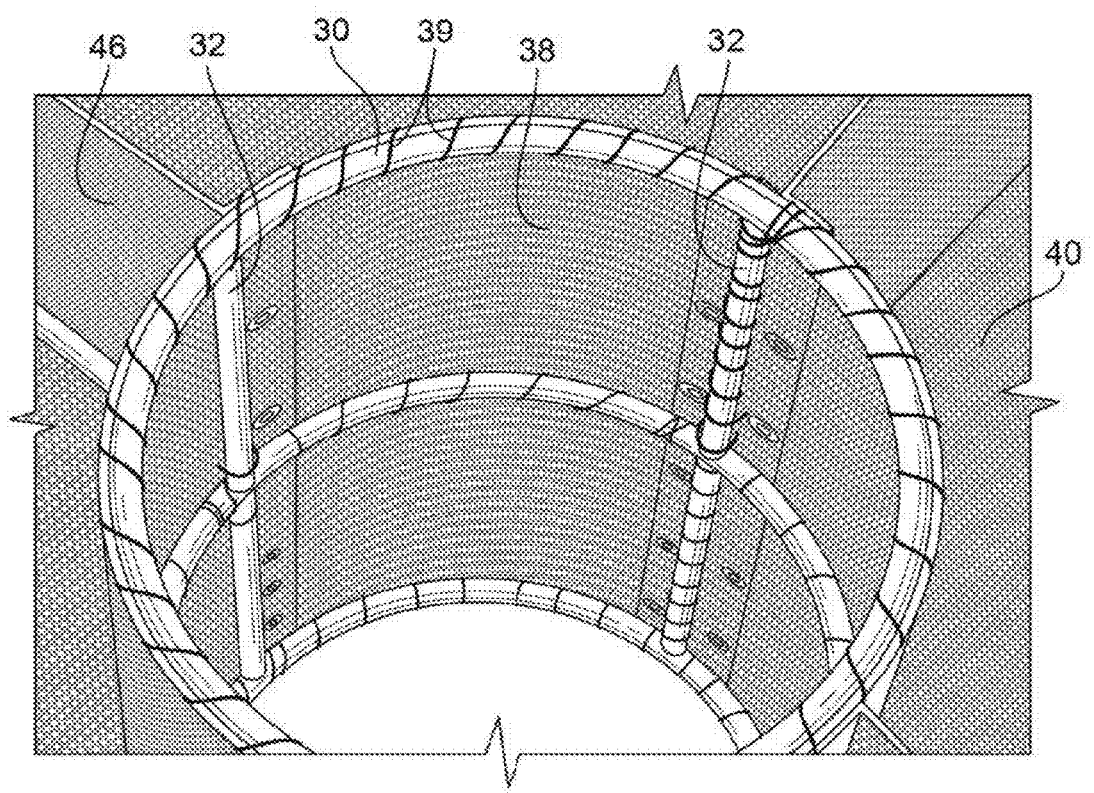
FIG. 3 is a top perspective view close up of the aperture of the catalyst basket.

Referring to FIGS. 1B and 3, the basket 10 includes a support frame 22. The support frame 22 can be arranged in layers such that the basket 10 includes an upper support frame layer 24 and a lower support frame layer 26. In addition, an intermediate support frame layer 25 (See FIG. 2) that is disposed between the upper and lower support frame layers can be included. Each support frame layer includes an outer ring 28 and an inner ring 30. The support frame 22 can include vertical supports 32 that can extend between the rings of the different layers of the support frame. The support frame can also include radial supports 34 that extend between the outer and inner rings of a respective layer. As shown in FIG. 1B, for example, four vertical supports 31 extend between the outer ring 28 of the upper layer and the outer ring of the intermediate layer. Similarly, four vertical supports 32 extend between the inner ring 30 of the upper layer and the inner ring of the intermediate layer. The vertical supports that connect the inner rings and the outer rings of the upper and intermediate layers are preferably the same length such that the upper and intermediate layers are maintained in generally parallel planes. In a similar arrangement, vertical supports connect the outer and inner rings of the intermediate layer and the bottom layer. In addition, as noted, radial supports 34 extend between the outer ring 28 and the inner ring 30 of the intermediate layer. The arrangement shown in FIG. 1B is structured such that radial supports are not required in the upper and lower layers, but they can optionally be included. The support frame elements (e.g., inner rings, outer rings, vertical supports and radial supports) can be metal, such as tubular metal, for example. The support frame elements can be connected using suitable fasteners and/or fastening methods, such as welding, for example.

The outer wall 36 of the basket 10 is supported by the outer rings 28 of each of the layers of the support frame. The outer wall 36 of the basket extends cylindrically around the basket to define the outer circumferential periphery thereof. Accordingly, the outer wall defines the outer limit of the cylindrical volume of the catalyst basket. The inner wall 38 of the basket is supported by the inner rings 28 of each of the layers of the support frame. The inner wall 38 of the basket extends cylindrically to define the inner boundary of the cylindrical volume of the catalyst basket. The inner wall 38 of the basket extends also defines the circumferential periphery of the aperture 12. The outer wall 36 is preferably permeable such that liquids can flow through the outer wall so that fluid can be exchanged between the interior and exterior of the basket. Similarly, the inner wall 38 is preferably permeable such that liquids can flow through the inner wall so that fluid can be exchanged between the interior and exterior of the basket. The outer and inner walls can be made from a mesh material, such as a woven steel mesh. Optionally, the outer, inner and dividing walls, or at least a portion thereof, can alternatively be made from non-permeable steel plate to prevent liquid entering and exiting the basket. In certain down flow reactors, the liquid flow is axial therefore no flow is expected to flow through the outer and inner walls and, therefore, surfaces, or at least portions thereof, that are parallel to the axial flow direction can be non-permeable. In some embodiments, for example, the mesh can be steel wire cloth, woven, 14×14 mesh with a 0.020 inch wire diameter. As can be seen in FIG. 3, for example, the wire mesh of the inner and outer walls can be secured to the support frame member using wire 39. Other suitable attachment means and methods are also contemplated.

A dividing wall 40 can extend between the outer ring 28 and the inner ring 30 and can be secured to the intermediate layer 25. As can be seen in FIGS. 1B and 2, the dividing wall 40 divides the interior of the basket into first and second chambers 42 and 44, respectively. The dividing wall 40 is fluid permeable so that fluid can flow through the dividing wall in an axial direction along the length (height) of the basket. For example, the dividing wall can be made of the same woven mesh as the inner and outer walls. In addition, partitions 46 can extend radially between the inner and outer rings of the support frames. As shown in FIG. 1B, four partitions 46 are provided in each of the upper and lower chambers, for example. The partitions 46 define compartments 48 in the upper and lower chambers. The compartments 48 can receive materials such as catalyst material. The partitions 46 are preferably not fluid permeable so that effect of material in one compartment can be more readily isolated from the material in an adjacent compartment. For example, the partitions can be solid steel sheet material.

As shown in FIG. 1B, the partitions can define four compartments in each of the upper and lower chambers, respectively, for example. Partitions can be added or removed to increase or decrease the number of compartments. Accordingly, the partitions 46 and the dividing wall 40 define the interior of the basket such that the basket has an upper chamber with four compartments and a lower chamber with four compartments, as illustrated. Preferably, the partitions in the upper and lower chambers are aligned so that a compartment in the lower chamber is aligned with a corresponding compartment in the upper chamber and are sized and shaped to be coextensive, without overlap. Alternatively, the partitions in the upper and lower chambers can be arranged such that a compartment in one chamber is sized, shaped, and positioned such that there is overlap between compartments along the axial direction.

The structural arrangement of basket in which each chamber includes multiple compartments allows for testing several different catalysts at the same time. In addition, dividing the basket into an upper chamber and a lower chamber allows for two-stage reactions in a single pass of the fluid in the axial direction along the basket. For example, in one compartment of one chamber a first catalyst is provided. In a second, corresponding compartment in the other chamber (i.e., the second compartment is axially aligned with the first compartment) a second catalyst is provided. Accordingly, fluid can pass through two layers of catalyst having differing properties. For example, the liquid can pass through the first compartment and come into contact with the catalyst contained therein. The catalyst in the first compartment can be one that hydrotreats the fluid by removing heteroatoms, i.e., sulfur, nitrogen, and hydrogen from the fluid. As the fluid travels along the axial direction of the basket the fluid enters the second compartment in the next chamber of the basket. The second compartment can include a different catalyst that can be used for cracking or further hydrogenation of the liquid as it comes into contact with the catalyst contained in the compartment. Two-stage reactions can thus be achieved with the catalyst basket of the present invention. The design is made to simulate a once-thru hydrocracking unit with two reactors in series of a single pass of the fluid through the basket. In addition, adjacent compartments can contain different catalyst materials so that different catalyst combinations can be tested simultaneously using the same reactor basket.

The two layer, multi-compartment design of the catalyst basket allows different combinations of catalysts to be tested using the same basket. For example, two different compartments in the first layer can contain catalysts A1 and A2. In addition, two different compartments in the second layer can contain catalysts B1 and B2. Accordingly, as the fluid passes through the reactor basket, the fluid is exposed to different combinations of catalysts. For example, one fluid flow path through the basket can first expose the fluid to the catalyst A1 contained in one compartment in the first layer of the basket. After the fluid is exposed to the catalyst A1, it passes into the second layer of the basket whereupon it is exposed to the second catalyst B1 contained in a compartment in the second layer of the basket. Similarly, the fluid can progress through another flow path in which the fluid is exposed to catalyst A2 in another compartment in the first layer of the basket and then is exposed to catalyst B2 in another compartment in the second layer of the basket. As such, the fluid flowing through the reactor basket and be exposed to a combination of catalysts A1 and B1 and, using the same catalyst basket in the same reactor, the fluid simultaneously can be exposed to the combination of catalysts A2 and B2.

Accordingly, multiple combinations of catalysts can be tested in the same chamber using the same basket simultaneously. As such, the basket design allows for efficient and effective testing of many catalysts and combinations so that more suitable and effective catalysts can be identified and employed in future reactions.

The covers 14 can be removed from the top and bottom ends of the basket to allow for filling the compartments with catalyst material. Clips can be provided on the sides of the basket for selectively attaching the covers to the ends of the basket. For example, the clips can be detached from a first cover and the cover can be removed to expose the compartments in the first chamber. Various catalyst materials can be added to the exposed compartments and the cover can be re-secured using the clips. Then the basket can be flipped so that the second cover at the other end of the basket can be removed to expose the compartment of the second chamber. Various catalyst materials can be added to the exposed compartments of the second chamber and the second cover can be re-secured using the clips. Accordingly, the two-layer, multi-compartment catalyst reactor basket can be loaded with catalyst. Hooks 50 (See FIG. 1) can optionally be connected to the frame of the basket. The hooks can support the basket and couple the basket to the internals of the reactor. The hooks can also be used to support the basket during loading and unloading of the catalyst at the end of the reactor cycle. The catalysts are usually vacuumed at the end of the cycle. By hanging the basket, the basket will be untacked during the catalyst vacuuming.

Figure 4:
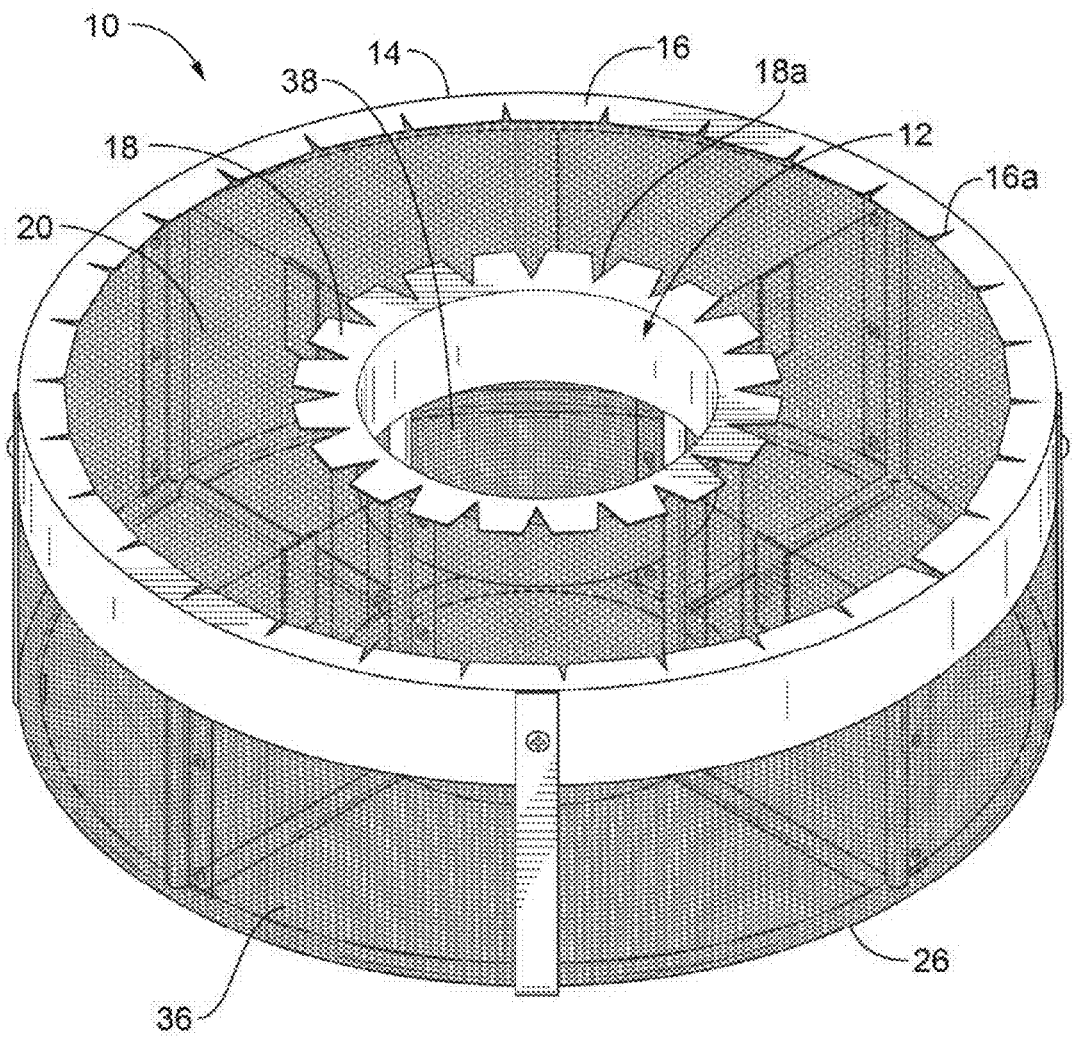
FIG. 4 is a top perspective view of the catalyst reactor basket according to another aspect of the invention.

FIG. 4 illustrates a catalyst basket having a single layer with four chambers. The four chamber can contain catalyst that allows axial flow through in a similar manner as described above.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A catalyst reactor basket, comprising:
   an outer side wall extending along the outer circumferential periphery of the basket and extending in an axial direction to define a generally cylindrical inner volume of the basket, at least a portion of the outer side wall being fluid permeable;
   an inner side wall disposed within the outer side wall, the inner side wall extending circumferential and axially to define an aperture that defines a inner boundary of the volume of the basket, the aperture being sized and shaped to allow a fluid to flow axially with respect to the basket, at least a portion of the inner side wall being fluid permeable;
   first and second covers disposed on opposite ends of the outer side wall and inner side wall, the first and second covers defining respective ends of the inner volume of the basket, at least a portion of the first and second covers being fluid permeable;
   a dividing wall disposed between the first and second covers, the dividing wall defining a first and second chamber within the inner volume of the basket, at least a portion of the dividing wall being fluid permeable; and
   a plurality of partitions disposed within the first and second chambers, each partition extending radially between the outer side wall and the inner side wall and extending axially between the dividing wall and a respective cover, the plurality of partitions defining a plurality of compartments within the first and second chambers, each compartment being sized and shaped to receive a catalyst.

2. The catalyst reactor basket as in claim 1, wherein a first compartment in the first chamber is aligned with a second compartment in the second chamber along an axis of the basket such that any fluid can flow through the first compartment and subsequently flow through the second compartment.

3. The catalyst reactor basket as in claim 2, wherein first compartment is sized to receive a first catalyst and the second compartment is sized to receive a second catalyst such that the fluid first contacts the first catalyst and subsequently contacts a second catalyst along an axial flow path of the fluid.

4. The catalyst reactor basket as in claim 3, wherein the first catalyst has properties that are different from the second catalyst.

5. The catalyst reactor basket as in claim 1, wherein the partitions provide a fluid barrier between adjacent compartments.

6. The catalyst reactor basket as in claim 1, wherein at least one compartment is sized to receive a first catalyst that has different properties than a second catalyst in an adjacent compartment.

7. The catalyst reactor basket as in claim 1, further comprising a support frame wherein the outer wall, inner wall, and dividing wall are supported by the frame.

8. The catalyst reactor basket as in claim 1, further comprising clips that removably secure the covers to respective ends of the basket.

9. The catalyst reactor basket as in claim 1, further comprising hooks coupled to the basket, the hooks being sized and shaped to support the basket such that the basket hangs from the hooks.

10. The catalyst reactor basket as in claim 4, wherein at least a portion of the inner side wall being fluid permeable.

11. The catalyst reactor basket as in claim 10, wherein at least a portion of the outer wall being fluid permeable.

\* \* \* \* \*